United States Patent
Trapp et al.

(10) Patent No.: US 7,416,102 B1
(45) Date of Patent: *Aug. 26, 2008

(54) METHOD OF FRICTION STIR WELDING AND MULTI-SECTION FACED SHOULDERLESS RETRACTABLE VARIABLE PENETRATION FRICTION STIR WELDING TOOL FOR SAME

(75) Inventors: Timothy J. Trapp, Columbus, OH (US); James J. Fisher, Jr., Columbus, OH (US); Jeffrey J. Bernath, Columbus, OH (US)

(73) Assignee: Edison Welding Institute, Inc., Columbus, OH (US)

( * ) Notice: Subject to any disclaimer, the term of this patent is extended or adjusted under 35 U.S.C. 154(b) by 443 days.

This patent is subject to a terminal disclaimer.

(21) Appl. No.: 11/109,519

(22) Filed: Apr. 19, 2005

Related U.S. Application Data

(63) Continuation-in-part of application No. 10/970,907, filed on Oct. 22, 2004, now Pat. No. 7,234,626.

(51) Int. Cl.
*B23K 37/00* (2006.01)
*B23K 20/12* (2006.01)
*B23K 31/02* (2006.01)

(52) U.S. Cl. .................... 228/2.1; 228/112.1

(58) Field of Classification Search .............. 228/112.1, 228/2.1
See application file for complete search history.

(56) References Cited

U.S. PATENT DOCUMENTS

| | | | |
|---|---|---|---|
| 4,144,110 A | 3/1979 | Luc |
| 5,460,317 A | 10/1995 | Thomas et al. |
| 5,611,479 A | 3/1997 | Rosen |
| 5,697,544 A | 12/1997 | Wykes |
| 5,713,592 A | 2/1998 | Dunell |
| 5,785,805 A | 7/1998 | Fix |
| 5,813,592 A | 9/1998 | Midling et al. |
| 6,029,879 A | 2/2000 | Cocks |
| 6,053,391 A | 4/2000 | Heideman et al. |
| 6,325,273 B1 | 12/2001 | Boon et al. |
| 6,669,075 B2 | 12/2003 | Colligan |

*Primary Examiner*—Jerry A. Lorengo
*Assistant Examiner*—Megha Mehta
(74) *Attorney, Agent, or Firm*—Gallagher & Dawsey Co LPA; Michael J. Gallagher; David J. Dawsey

(57) ABSTRACT

A method of friction stir welding and a non-consumable multi-section faced retractable shoulderless variable penetration friction stir welding tool. The tool includes a substantially cylindrical body portion, a head portion, and a tip section, each integral to the tool. The body portion has a longitudinal axis about which it is rotable, a diameter, a sidewall substantially parallel to the longitudinal axis, a proximal end, and a distal end. The head portion is located at the distal end of the body portion. The head portion includes a multi-section face, having a first face section and a second face section, that converges to the tip section. The tool is retractable, reduces overheating, improves weld quality by reducing internal voids and lack of fusion, and facilitates variable penetration welds.

9 Claims, 13 Drawing Sheets

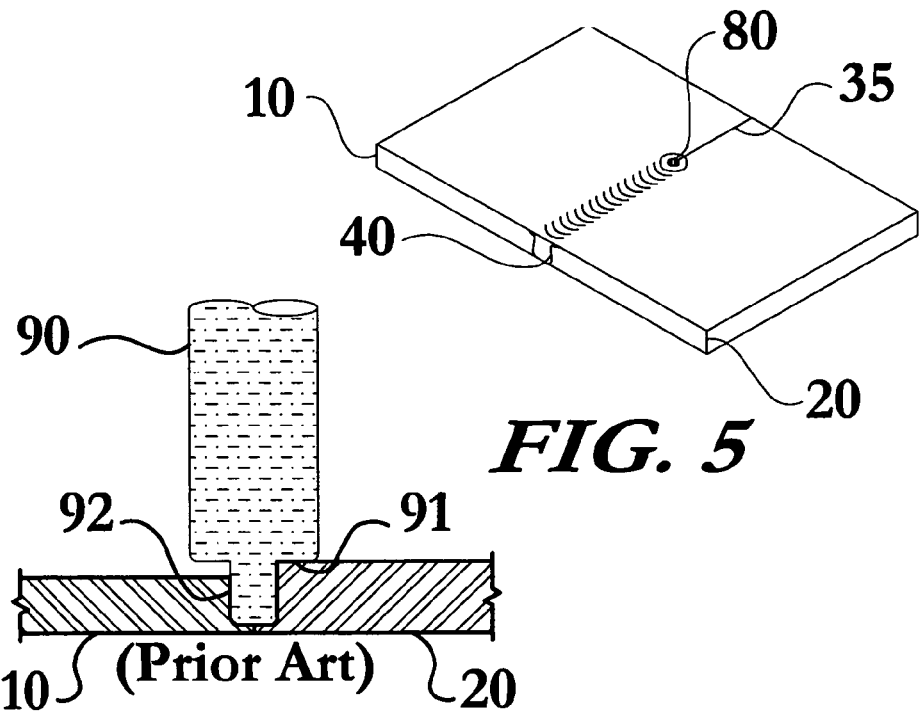
FIG. 5
FIG. 6 (Prior Art)
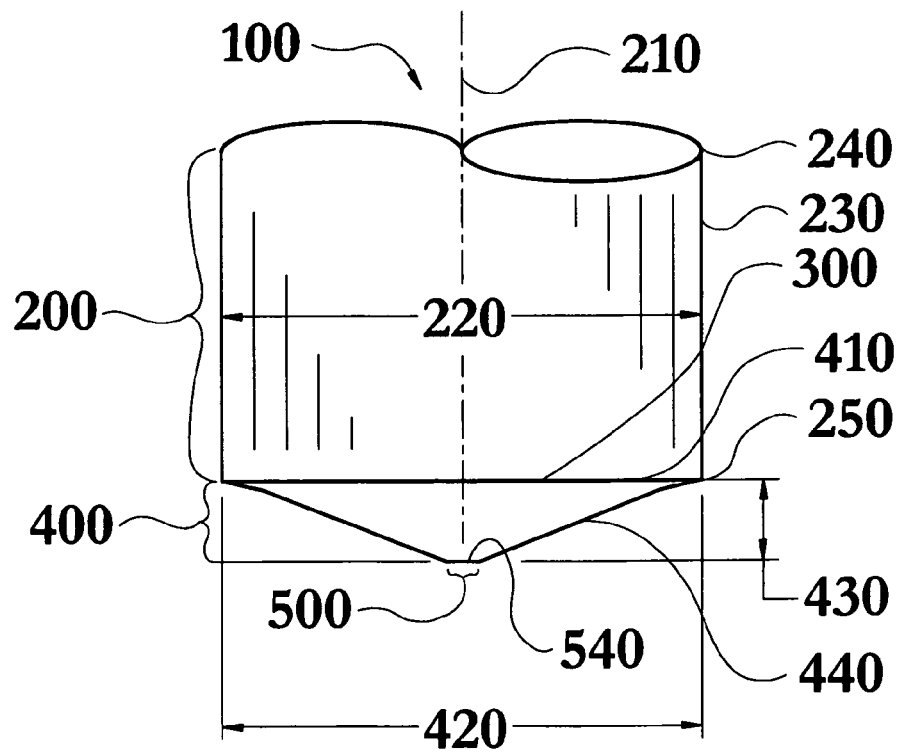
FIG. 7

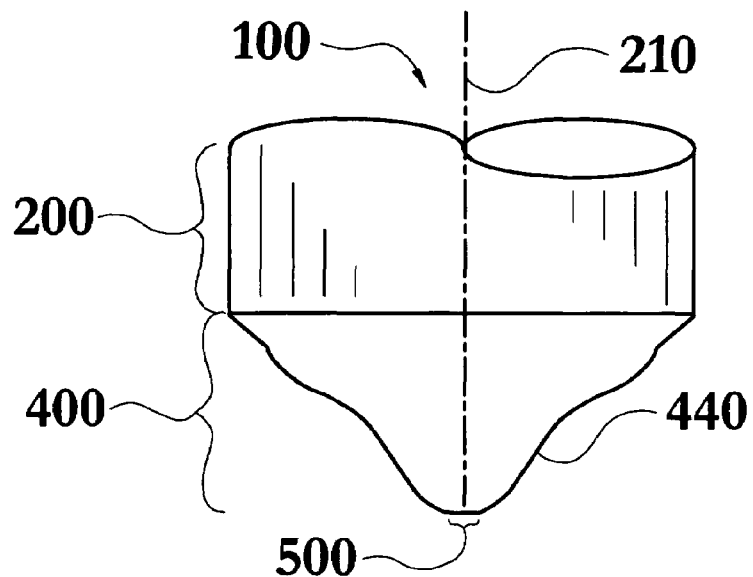
FIG. 13
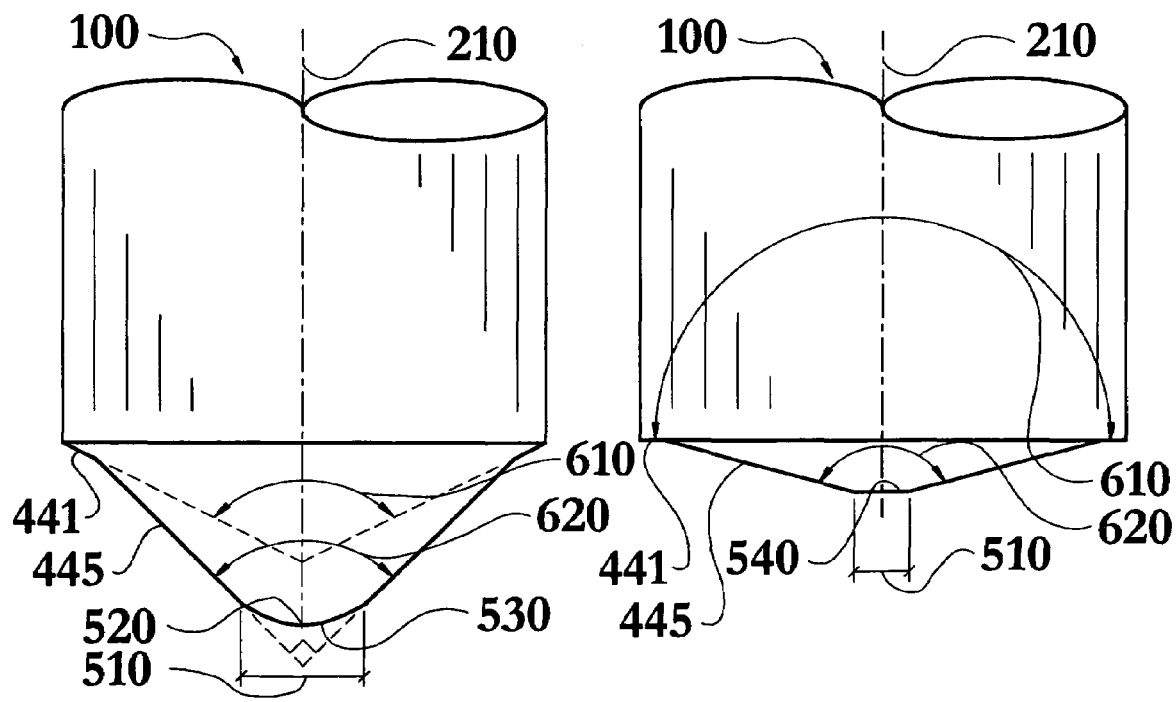
FIG. 14  FIG. 15

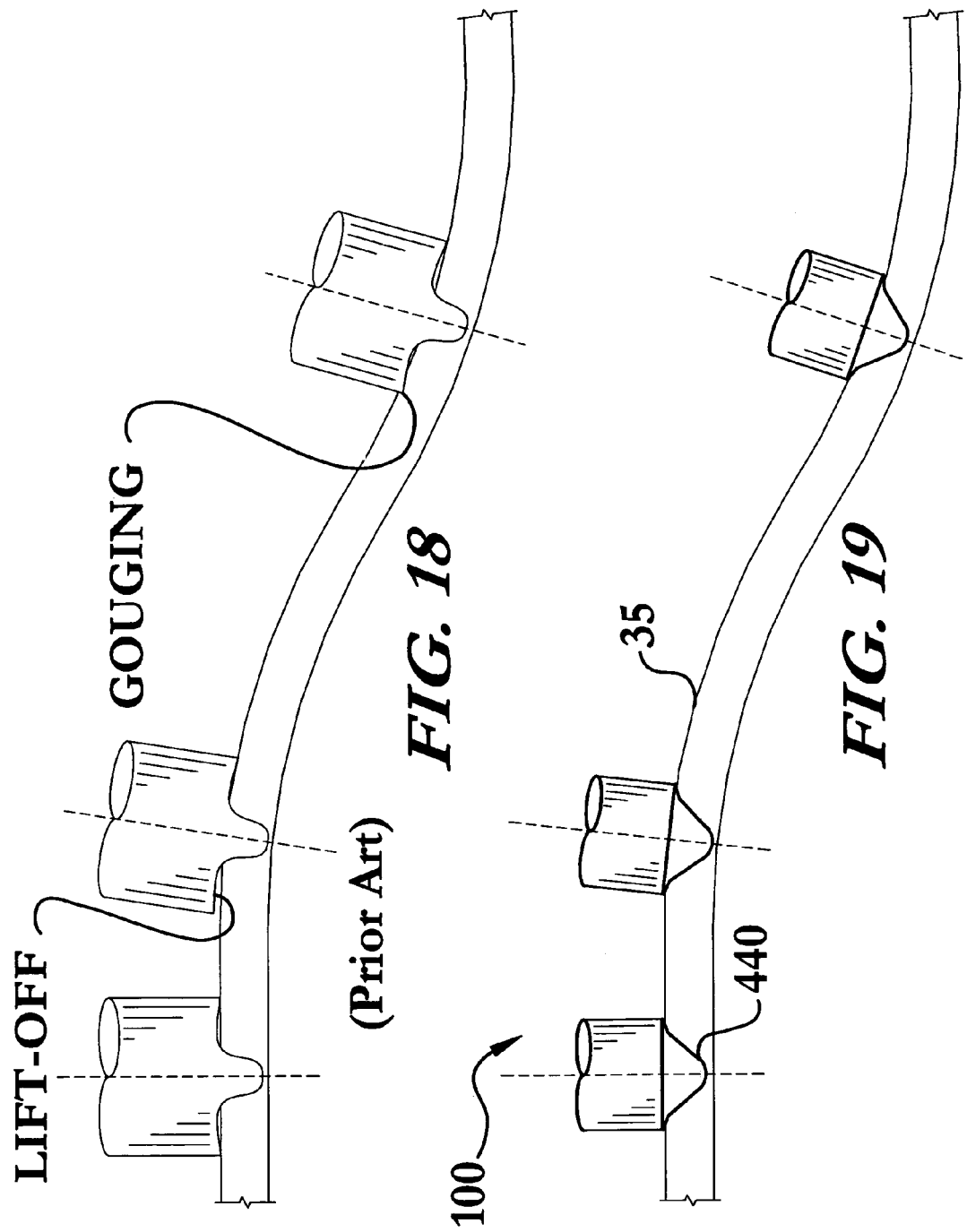

METHOD OF FRICTION STIR WELDING AND MULTI-SECTION FACED SHOULDERLESS RETRACTABLE VARIABLE PENETRATION FRICTION STIR WELDING TOOL FOR SAME

REFERENCE TO RELATED DOCUMENTS

This application is a continuation-in-part of a previous application filed in the United States Patent and Trademark Office on Oct. 22, 2004, titled "Method for Friction Stir Welding and Retractable Shoulderless Variable Penetration Friction Stir Welding Tool for Same," and given Ser. No. 10/970,907, now U.S. Pat. No. 7,234,626 all of which is incorporated here by reference as if completely written herein.

STATEMENT REGARDING FEDERALLY SPONSORED RESEARCH OR DEVELOPMENT

This invention was not made as part of a federally sponsored research or development project.

TECHNICAL FIELD

The present invention relates to the field of friction stir welding; particularly, to a single piece non-consumable friction stir welding tool and methods that can perform variable penetration welds, variable width welds, weld workpieces of differing thicknesses, weld workpieces having complex curvature, retract from the weld during welding without producing an exit hole, and improve the quality of friction stir welds.

BACKGROUND OF THE INVENTION

Those in the wide ranging materials joining industries have recognized the benefits of friction stir welding (FSW) since its invention, only to be precluded from widespread application due to a number of factors. FSW is a relatively simple method of solid phase welding developed by The Welding Institute in the early 1990's. The conventional process utilizes a specially shaped nonconsumable cylindrical tool with a profiled pin, often threaded, extending from a shoulder of the tool, that is rotated and plunged into a joint formed by abutting edges of the workpieces that are to be joined until a surface of the shoulder contacts the surface of the workpieces. The rotating tool plasticizes a region of the workpieces around the pin and beneath the shoulder. The tool is then advanced along the joint. The rotation of the tool develops frictional heating of the workpieces, from both shoulder friction and pin friction, as well as adiabatic heating, and the tool forces plasticized workpiece material from the leading edge of the tool to the rear of the tool where it consolidates and cools to form a high quality weld.

The FSW tool is generally a cylindrical piece with a shoulder face that meets a pin that projects from the shoulder face at a right angle, as illustrated in U.S. Pat. Nos. 5,460,317 and 6,029,879. In some instances, the pin actually moves in a perpendicular direction in an aperture formed in the face of the shoulder, as illustrated in U.S. Pat. Nos. 5,611,469; 5,697, 544; and 6,053,391. The face of the shoulder may be formed with an upward dome that is perpendicular to the pin, as illustrated in U.S. Pat. Nos. 5,611,479; 5,697,544; and 6,053, 391. The dome region and an unobstructed shoulder face to pin interface have been considered essential for the proper frictional heating of the workpiece material. Traditional thinking held that the dome region of the shoulder serves to constrain plasticized material for consolidation at the trailing edge of the FSW tool so as to prevent it from extruding out from under the sides of the tool. For example, U.S. Pat. No. 5,813,592 states at column 1, lines 42-51, that "In order to achieve a proper consolidation of the weld metal the probe bottom part (shoulder) must maintain during the whole welding operation (forward movement) in an intimate contact with [the] surface of the joined members. If the probe shoulder during this forward movement even temporarily 'lifts' from the surface a small amount of plasticised welding material will be expelled behind the probe thus causing occurrence of voids in the weld since there is no available material to fill the vacant space after the expelled material." The present invention proves this long-held belief false.

Since FSW is a solid-state process, meaning there is no melting of the materials, many of the problems associated with other fusion welding methods are avoided, including solidification cracking, shrinkage, and weld pool positioning and control. Additionally, FSW minimizes distortion and residual stresses. Further, since filler materials are not used in FSW, issues associated with chemical segregation are avoided. Still further, FSW has enabled the welding of a wide range of alloys that were previously unweldable. Yet another advantage of FSW is that it does not have many of the hazards associated with other welding means such as welding fumes, radiation, high voltage, liquid metals, or arcing. Additionally, FSW generally has only three process variables to control (rotation speed, travel speed, and pressure), whereas fusion welding often has at least twice the number of process variables (purge gas, voltage, amperage, wire feed speed, travel speed, shield gas, and arc gap, just to name a few). Perhaps most importantly, the crushing, stirring, and forging of the plasticized material by the FSW tool often produces a weld that is more reliable than conventional welds and maintains material properties more closely to those of the workpiece properties, often resulting in twice the fatigue resistance found in fusion welds.

Despite all the advantages of FSW, it has only found very limited commercial application to date due to many difficulties associated therewith. One early problem associated with single-piece FSW tools 90, as seen in FIG. 1, was that they leave an exit hole 80 in the weld 40, as seen in FIG. 5, that must be filled after completion of the friction stir weld. Such single-piece FSW tools 90 are also plagued with premature breakage of the pin 92 during welding, resulting in the pin 92 being permanently lodged in the weld 40. Such breakage is often attributed to tool design that has relatively poor heat distribution and areas of high stress concentration, such as at the pin 92 to shoulder 91 interface, also known as the transition region 93, seen in FIG. 1. In an effort to eliminate exit holes 82 the retractable pin tool 95 was developed, as seen in FIG. 2. The retractable pin tool 95 essentially splits the conventional shouldered FSW tool 90 into two separate components, namely a shoulder portion 96 that is hollow and receives the pin 97 that may extend and retract from the shoulder 96. The independent movement of the pin 97 permits the pin 97 to be gradually withdrawn from the weld 40 while the shoulder 96 remains in contact with the workpieces 10, 20, thereby eliminating the exit hole 80.

While the retractable pin tool 95 may eliminate the exit hole 82, it has several drawbacks. The retractable pin tool 95 is prone to breakage due to the high stress concentrations at the shoulder 96 to pin 97 interface. The retractable pin tool 95 is also susceptible to binding between the pin 97 and the shoulder 96 as stirred weld metal can be forced into the gap between the pin 97 and the shoulder 96.

Another problem with both conventional shouldered FSW tools 90 and retractable pin tools 95 is the overheating caused by the shoulder 91, 96. During FSW with conventional shouldered FSW tools 90, 95 the weld 40 is repeatedly subjected to the pressure and rotation of the tool shoulder 91, 96. As a conventional FSW tool 90, 95 traverses a joint 35 the material is first exposed to the leading edge of the shoulder 91, 96 that is generally exerting a downward force on the workpieces 10, 20 of several hundred pounds, often several thousand pounds, and is rotating at RPM's ranging from under 100 rpm to over 1000 rpm, while traversing the joint 35 rather slowly, generally less than ten inches per minute (IPM), depending on the materials being joined and their thickness. Taking for example a simple illustrative case of a conventional tool 90, 95 traversing a joint 35 at 6 IPM and 800 RPM, it takes 10 seconds to traverse a one inch section of the joint 35 during which 80 revolutions of the tool 90, 95 are made, resulting in 160 exposures of weld 40 to the shoulder 91, 96 (an exposure at the leading edge and the trailing edge for each revolution). Such repeated exposure to the shoulder 91, 96 results in the overheating of the weld 40 and the associated drawbacks. Prior methods and apparatus have indicated that such top surface friction heating and weld material containment contributed by the shoulder were essential to FSW. In fact, the definition of friction stir welding in most welding references includes the mention of a tool having a pin and a shoulder, thus a tool lacking a shoulder, or a shoulderless tool, as in the present invention, is a completely new concept.

Further, conventional shouldered FSW tools 90 and retractable pin tools 95 are generally ineffective at joining workpieces 10, 20 of different thickness, as seen in FIG. 6. This is due in large part to the fact that such tools 90, 95 are designed for a specific pin 92, 97 length for a particular material thickness. Such designs necessitate a unique tool for each thickness of material to be joined. The retractable pin tool 95 may reduce the number of tools needed to make welds in materials having differing thicknesses, but it too is limited in that each retractable pin tool 95 has a limited useful range established by the diameter of the shoulder. For instance, if the material is too thick or thin then under-heating or over-heating will occur. Additionally, one can easily appreciate that the pin 97 of a retractable pin tool 95 designed for use in joining ⅛" thick sheets will be ineffective and will fail if it is simply further extended from the shoulder 96 in trying to join ½" thick plates.

Additionally, conventional shouldered FSW tools 90 and retractable pin tools 95 cannot be used in joining workpieces having more than slight curvature. Such tools 90, 95 provide inadequate contact, also referred to as lift-off, or result in gouging of workpieces, as seen in FIG. 18. Such lift-off and gouging results in welds having reduced aesthetic qualities that often require grinding of the surface and diminish the mechanical properties of the weld.

Yet another problem associated with conventional shouldered FSW tools 90 and retractable pin tools 95 is the flow characteristics imparted on the weld material due to the transition region 93, labeled in FIG. 1, between the shoulder 91 and the pin 92. The transition region 93 in shouldered tools 90, 95 often causes dead zones and eddies in the material flow resulting in subsurface voids and lack of fusion in the weld 40. Such problems greatly limit the robustness of the conventional tools and methods, particularly on joints that vary in geometry or heat distribution due to part shape or tooling.

A friction stir weld 40 created with conventional shouldered FSW tools 90, 95 has several distinct regions, as seen in FIG. 3, where the direction of travel of the tool 90 is into the paper. First, the metal away from the immediate vicinity of the weld 40 that is not affected by the weld is known as the base metal 50. Closer to the actual weld 40 is the heat affected zone (HAZ) 60 where the material has experienced a thermal cycle that has modified the microstructure and/or mechanical properties, yet has no plastic deformation. Next, closer to the tool 90, 95 is the thermomechanically affected zone (TMAZ) 70 where the material has seen limited plastic deformation by the tool 90, 95, and the heat from the process has also exerted some influence on the material. With the exception of aluminum, most materials exhibit recrystallization throughout the TMAZ 70. Aluminum often exhibits recrystallization in only a portion of the TMAZ, often referred to as the nugget. Within the TMAZ 70 is the stir zone 75, seen in FIG. 4, having non-uniform grain structure from the violent deformation that materials in this region undergo while hot. The stir zone 75 has a shoulder region 76 and a pin region 77. The pin region 77 is that region that nas been directly exposed to the pin 92, whereas the shoulder region 76 is the region just outside of the pin region 77 and below the shoulder 91, 96 of the tool 90, 95. The shoulder region 76 flares out further away from the pin 92, 97 near the surface of the workpiece nearest the shoulder 91, 96, due to the effects of the shoulder 91, 96. This flared-out portion of the shoulder region 76, or re-stir area, near the surface of the weld 40 is the area most commonly exposed to overheating and the associated annealing and overageing effects that reduce the weld properties.

Additionally, the design of conventional shouldered FSW tools 90, 95 is prone to excessive wear and poor heat and load distribution. These problems are largely attributable to the longstanding belief that FSW tools must have a relatively narrow pin and wide shoulder.

Accordingly, the art has needed a tool, and associated methods, that eliminate the need for a shoulder and thereby eliminate the multitude of problems associated with the shoulder. An ideal tool would be simple in design and construction; inexpensive; allow for retractability during welding thereby eliminating the exit hole; accommodate joining materials of differing thicknesses; facilitate variable penetration depth; improve weld quality by reducing internal voids and lack of fusion; and eliminate the re-stir area of the stir region. While some of the prior art devices attempted to improve the state of the art, none has achieved the unique and novel configurations and capabilities of the present invention. With these capabilities taken into consideration, the instant invention addresses many of the shortcomings of the prior art and offers significant benefits heretofore unavailable. Further, none of the above inventions and patents, taken either singly or in combination, is seen to describe the instant invention as claimed.

SUMMARY OF INVENTION

In its most general configuration, the present invention advances the state of the art with a variety of new capabilities and overcomes many of the shortcomings of prior methods in new and novel ways. In its most general sense, the present invention overcomes the shortcomings and limitations of the prior art in any of a number of generally effective configurations.

In one of the many preferable configurations, the non-consumable multi-section faced retractable shoulderless variable penetration friction stir welding tool includes a substantially cylindrical body portion, a head portion, and a tip section, each integral to the tool. The body portion has a longitudinal axis about which it is rotable, a diameter, a sidewall substantially parallel to the longitudinal axis, a proximal end, and a distal end.

The head portion has a base with a diameter substantially equal to the diameter of the body portion, thereby forming a transition between the body portion and the head portion. The head portion includes a multi-section face that converges to the tip section. The multi-section face includes at least a first face section and a section face section. The tool lack of a shoulder in the traditional sense of friction stir welding therefore has numerous advantages that have long been overlooked by those in the FSW industry. Prior methods and apparatus have indicated that top surface friction heating and weld material containment were essential to FSW.

The present invention's elimination, or minimization, of any portion of the tool that contacts the top surface of either workpiece away from the point at which the tool enters the workpiece(s) has several advantages. One such advantage is the elimination of the primary source of overheating. Additionally, another advantage of the present tool is the reduction of internal voids and lack of fusion that are associated with the transition region between the shoulder and the pin, as well as the transition from the pin to the pin tip. Further, the present design allows the use of a single tool in performing welds of varying depth and/or width, performing welds to join workpieces having differing thicknesses, performing welds to join workpieces having complex curvatures, and in retracting the tool to leave a weld free of an exit hole.

Numerous variations, modifications, alternatives, and alterations of the various preferred embodiments, processes, and methods may be used alone or in combination with one another as will become more readily apparent to those with skill in the art with reference to the following detailed description of the preferred embodiments and the accompanying figures and drawings.

BRIEF DESCRIPTION OF THE DRAWINGS

Without limiting the scope of the present invention as claimed below and referring now to the drawings and figures:

FIG. 5 shows an elevated perspective view of a first and second workpiece being joined by FSW and the associated exit hole left by conventional shouldered FSW tools, not to scale;

FIG. 6 shows a cross-section of a typical conventional shouldered FSW tool and a first and second workpiece of differing thicknesses, not to scale;

FIG. 7 shows a front elevation view of an embodiment of the tool of the present invention, not to scale;

FIG. 13 shows a front elevation view of an embodiment of the tool of FIG. 7, not to scale;

FIG. 14 shows a front elevation view of an embodiment of the tool of FIG. 7, not to scale;

FIG. 15 shows a front elevation view of an embodiment of the tool of FIG. 7, not to scale;

FIG. 18 shows a partial cross-section of typical conventional shouldered FSW tool traversing an undulating joint, not to scale;

FIG. 19 shows a partial cross-section of one embodiment of the tool of FIG. 7 traversing an undulating joint, not to scale;

DETAILED DESCRIPTION OF THE INVENTION

Figure 1:
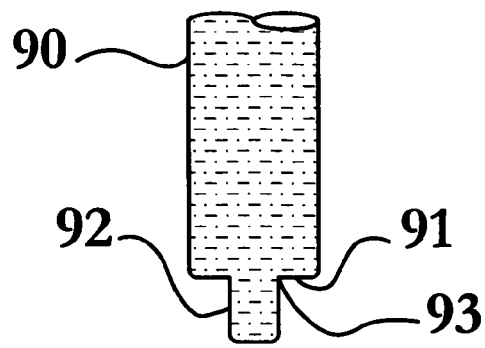
FIG. 1 shows a cross-section of a typical conventional shouldered FSW tool, not to scale.

The non-consumable multi-section faced retractable shoulderless variable penetration friction stir welding tool and methods of friction stir welding of the present invention enable a significant advance in the state of the art. The preferred embodiments of the method and apparatus accomplish this by new and novel methods that are configured in unique and novel ways and which demonstrate previously unavailable but preferred and desirable capabilities. The description set forth below in connection with the drawings is intended merely as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention.

The present invention includes several methods of friction stir welding (FSW) and a non-consumable multi-section faced retractable shoulderless variable penetration friction stir welding tool 100 for performing the methods. The non-consumable multi-section faced retractable shoulderless variable penetration friction stir welding tool 100 is used in joining a first workpiece 10 and a second workpiece 20 with a friction stir weld 40. The tool 100 includes a substantially cylindrical body portion 200, a head portion 400, and a tip section 500, each integral to the tool 100, as seen in FIG. 7. The body portion 200 has a longitudinal axis 210 about which it is rotable, a diameter 220, a sidewall 230 substantially parallel to the longitudinal axis 210, a proximal end 240, and a distal end 250.

Figure 8:
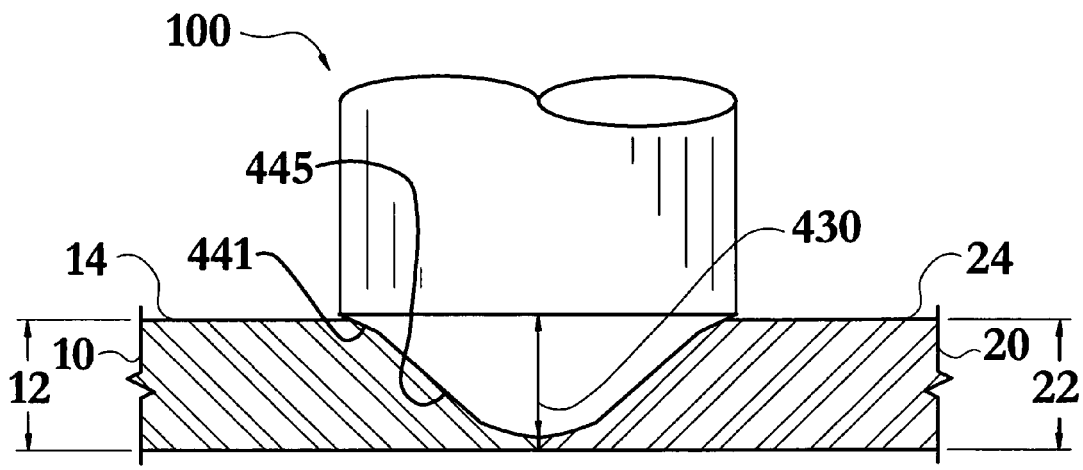
FIG. 8 shows a partial cross-section of a joint with the tool of FIG. 7 joining a first and a second workpiece by FSW, not to scale.
Figure 9:
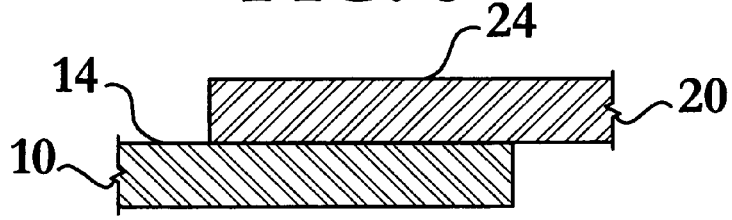
FIG. 9 shows a first and a second workpiece configured in a lap joint, not to scale.
Figure 10:
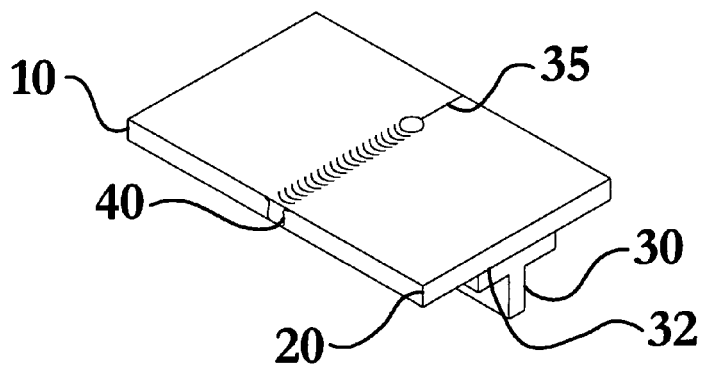
FIG. 10 shows a first and a second workpiece configured in butt joint arrangement with a third workpiece below to be jointed by a lap joint.
Figure 22:
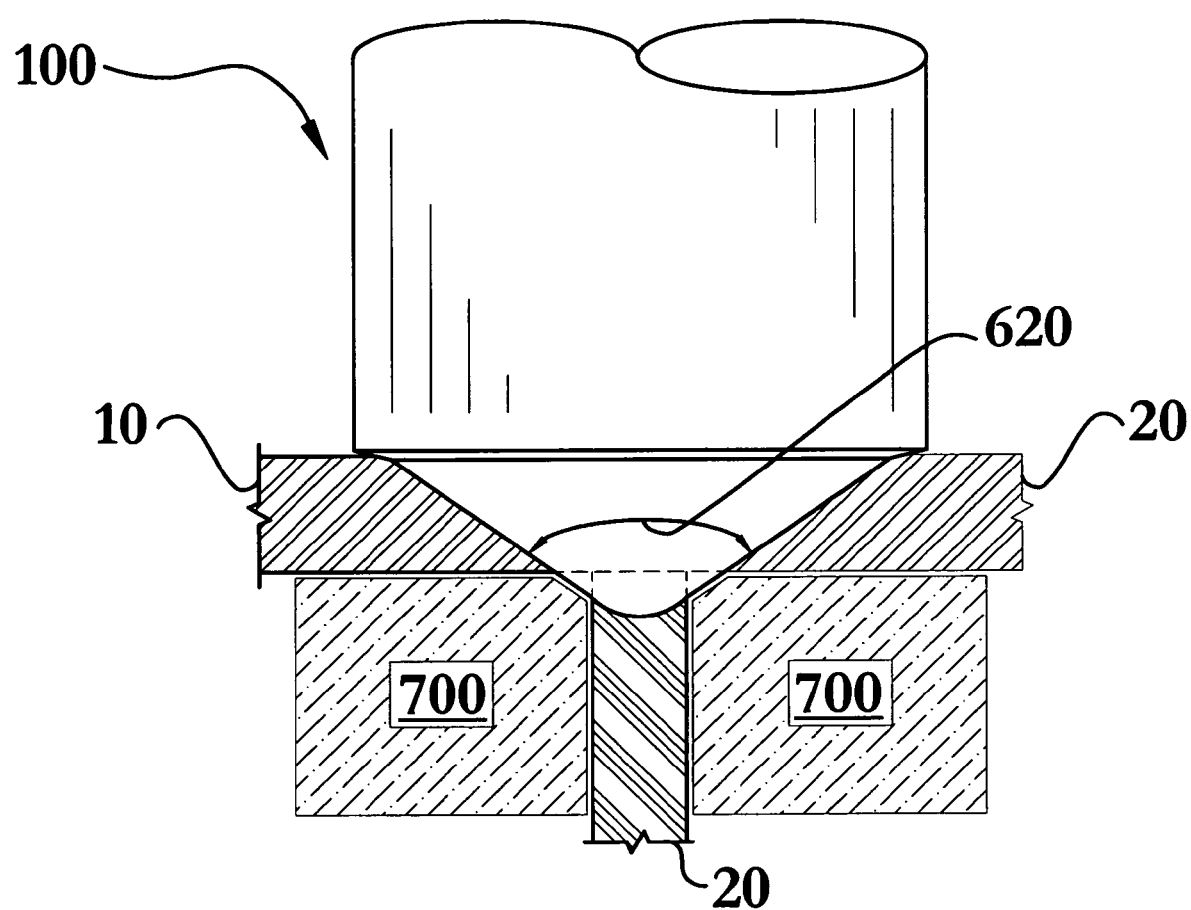
FIG. 22 shows a partial cross-section of a first and a second workpiece configured in tee joint arrangement being welded by an embodiment of the present invention, not to scale.

The first workpiece 10 has a first thickness 12 and a top surface 14. Similarly, the second workpiece 20 has a second thickness 22 and a top surface 24, as seen in FIG. 8. The tool 100 and methods of the present invention work equally as well on butt joints, as seen in FIG. 5; lap joints, as seen in FIG. 9; combination butt and lap joints, as seen in FIG. 10; tee joints, as seen in FIG. 22; corner joints, not illustrated but undersood by one with skill in the art; as well as bead on plate welds to alter the local characteristics of a plate due to friction stir processing of the material with the tool.

Referring again to FIG. 7, the head portion 400 is located at the distal end 250 of the body portion 200. The head portion 400 has a base 410 with a diameter 420 substantially equal to the diameter 220 of the body portion 200 thereby forming a transition 300 between the body portion 200 and the head portion 400. The head portion 400 includes a multi-section face 400, having at least a first face section 441 nearest the body portion and a second face section 445 nearest the tip section, labeled in FIG. 8, that converges to the tip section 500. The tip section 500 has a diameter 510 and a center 520 wherein the center 520 is located substantially on the longitudinal axis 210, illustrated in FIGS. 14 and 15. Referring again to FIG. 7, the head portion 400 and the tip section 500 define a height 430 from the distal-most portion of the tip section 500 to the base 410 along the longitudinal axis 210. The transition 300 may incorporate a smooth curve between the body portion 200 and the head portion 400, but it is not required.

Figure 2:
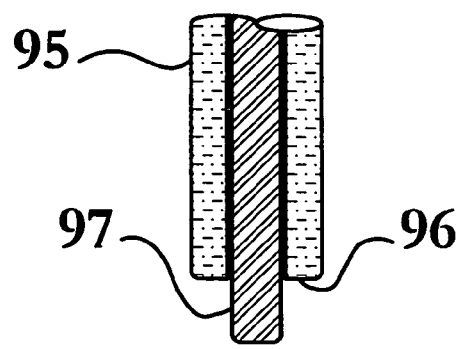
FIG. 2 shows a cross-section of a typical conventional shouldered retractable pin tool, not to scale.

The substantially equal diameters 220, 420 of the body portion 200 and the head portion 400, along with the transition 300 therebetween, establish that the present invention lacks a shoulder as is present in prior art friction stir welding tools 90, 95, as seen in FIGS. 1 and 2. This lack of a shoulder has numerous advantages that have long been overlooked by those in the FSW industry.

Figure 11:
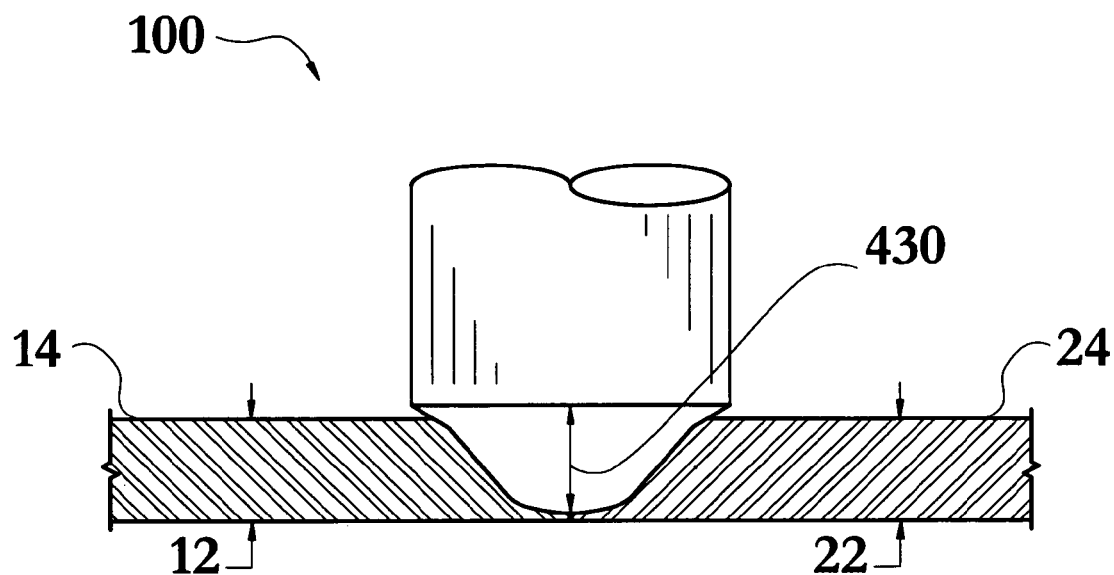
FIG. 11 shows a partial cross-section of a joint with an embodiment of the tool of FIG. 7 joining a first and a second workpiece by FSW, not to scale.

The shoulder 91, 96 of conventional shouldered FSW tools 90 as well as retractable pin tools 95, as seen in FIGS. 1 and 2, is the source of many problems and confusion in FSW, which have been previously explained in the Background of the Invention herein. In short, the present tool 100 does not require a shoulder 91, 96 to retain the plasticized material of the FSW, contrary to the teachings of the leaders in the field. Referring to FIG. 11, the present invention's elimination, or minimization, of any portion of the tool 100 that contacts the top surface 14, 24 of either workpieces 10, 20 away from the point at which the tool enters the workpieces(s) 10, 20 has several advantages.

Figure 3:
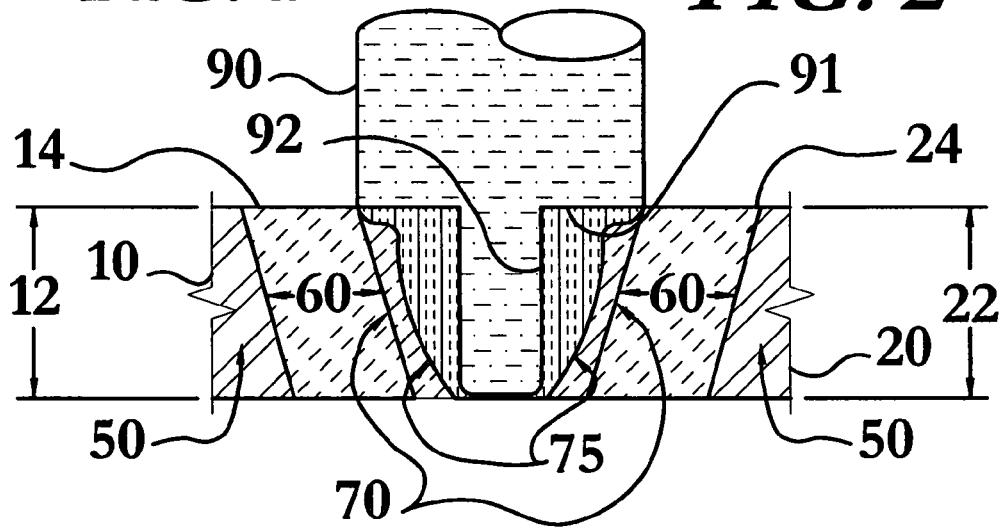
FIG. 3 shows a cross-section of a first workpiece and a second workpiece as they are joined by FSW, not to scale.
Figure 4:
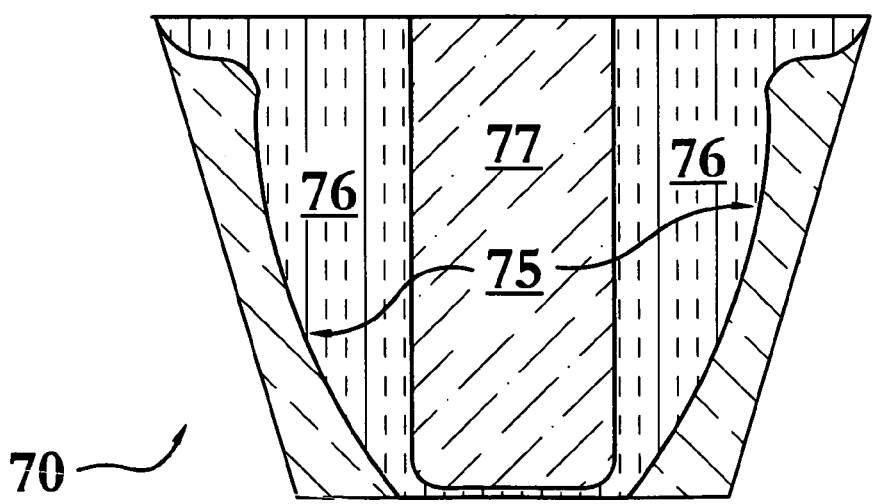
FIG. 4 shows an enlarged cross-section of a portion of FIG. 3, not to scale.

One such advantage is the elimination of the primary source of overheating. Referring again to FIGS. 1-3, during FSW with prior shouldered FSW tools, the weld 40 is repeatedly subjected to the pressure and rotation of the tool shoulder 91, 96. As a conventional FSW tool 90, 95 traverses a joint 35 the material is first exposed to the leading edge of the shoulder 91, 96 that is generally exerting a downward force on the workpieces 10, 20 of several hundred pounds, often several thousand pounds, and is rotating at several hundred RPM, while traversing the joint rather slowly, generally less than ten inches per minute (IPM). One with skill in the art will understand that such characteristics are dependent on a number of factors including the material being joined and its thickness. Taking, for example, a simple illustrative case of a conventional tool 90, 95 traversing a joint 35 at 6 IPM and 800 RPM, it takes 10 seconds to traverse a one inch section of the joint 35 during which 80 revolutions of the tool 90, 95 are made, resulting in 160 exposures of weld 40 to the shoulder 91, 96 (an exposure at the leading edge and the trailing edge for each revolution). Such repeated exposure to the shoulder 91, 96 results in the overheating of the weld 40 and the associated drawbacks, as previously explained. The present invention includes a method of reducing the amount of overheating experienced by a friction stir weld 40 by ensuring that while traversing the joint 35 with the rotating tool 100, no portion of the tool 100, or a minimal portion of the tool 100 substantially smaller than that of conventional FSW tool, away from the entry penetration of the tool 100 into the workpieces 10, 20, comes in contact with the top surface 14, 24 of either workpiece 10, 20. Prior methods and apparatus have indicated that such top surface friction heating and weld material containment were essential to FSW.

Another advantage of the present tool 100 and methods is the reduction of internal voids and lack of fusion that are associated with the transition region 93, labeled in FIG. 1, between the shoulder 91, 96 and the pin 92, 97 of traditional friction stir welding tools 90, 95. As previously discussed in the Background of the Invention herein, the transition region 93 between the shoulder 91, 96 and the pin 92, 97 is the source of many problems in tool design and affects the characteristics of the resulting weld. Such problems are particularly pronounced in conventional retractable pin tools 95, illustrated in FIG. 2, because the transition region changes as the pin 97 enters the workpieces 10, 20 or retracts from the workpieces 10, 20.

Figure 17:
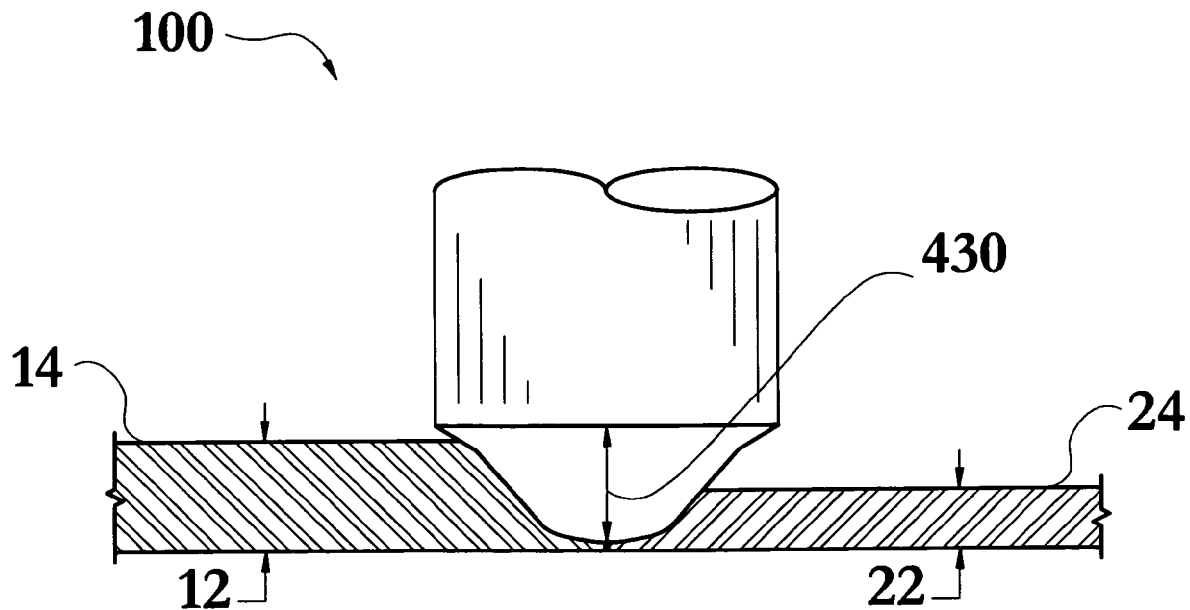
FIG. 17 shows a partial cross-section of a joint with the tool of FIG. 7 joining a first and a second workpiece of differing thicknesses by FSW, not to scale.

Yet another advantage of the present non-consumable multi-section faced retractable shoulderless variable penetration tool 100 and methods of the present invention is that the elimination of a shoulder 91 allows the use of a single tool 100 in performing welds 40 of varying depth, performing welds 40 to join workpieces having differing thicknesses, and in retracting the tool 100 to leave a weld 40 free of an exit hole 80, as seen in FIG. 5. Conventional single-piece shouldered FSW tools 90, as seen in FIG. 1, have a fixed pin length projecting from the shoulder 91 and therefore are limited to performing welds of a single penetration depth. The present tool 100 is designed such that the height 430 of the head portion 400 may be (i) less than or equal to the lesser of the first workpiece thickness 12 or the second workpiece thickness 22 such that the entire tip section 500, head portion 400, and a portion of the body portion 200 are in the friction stir weld 40 during welding, or alternatively (ii) greater than or equal to the greater of the first workpiece thickness 12 or the second workpiece thickness 22 such that the entire tip section 500 and a portion of the head portion 400 are in the friction stir weld 40 during welding, as seen in FIG. 11. This ability to submerge a portion of the body portion 200 into the weld 40 permits use of the tool 100 in creating spot welds. Additionally, the tool 100 permits the joining of a first workpiece 10 and a second workpiece 20 wherein they have unequal thicknesses 12,14, as shown in FIG. 17.

Along with the ability to perform variable depth welds comes the ability to vary the width of the welds. As one with skill in the art can appreciate, the further the tool 100 of the present invention penetrates into the joint 35 with wider the weld 40 becomes. This, along with the ability of the present invention to be plunged into the joint 35 as it is traversing the joint 35, permits the economical use of friction stir welding in performing tack welds. Such tack welds are particularly useful in holding parts in the tooling.

Additionally, one with skill in the art can appreciate that cooperating tools may be use in creating full penetration welds in thicker workpieces with one tool penetrating half way into the joint from one side of the joint and a second tool penetrating half way into the joint from the opposite side of the joint.

The shoulderless design of the present tool 100 permits the friction stir welding of workpieces 10, 20 having significant curvature. In the past conventional shouldered friction stir welding tools 90, 95 have not been able to join workpieces 10, 20 having more than slight undulation because of shoulder 91, 96 interference. As seen in FIG. 18, while traversing down a slope the shoulder 91, 96 of conventional tools 90, 95 would lift-off, or separate from the joint 35, at either the leading edge of the shoulder 91, 96 or the trailing edge of the shoulder 91, 96 depending on the motion control system. Alternatively, while traversing down in to a valley or up from a valley, the shoulder 91, 96 of conventional tools 90, 95 would gouge into the joint at either the trailing edge of the shoulder 91, 96 or the leading edge of the shoulder 91, 96 depending on the motion control system. Suck lift-off and gouging results in welds having reduced aesthetic qualities that often require grinding of the surface and diminish the mechanical properties of the weld.

Figure 23:
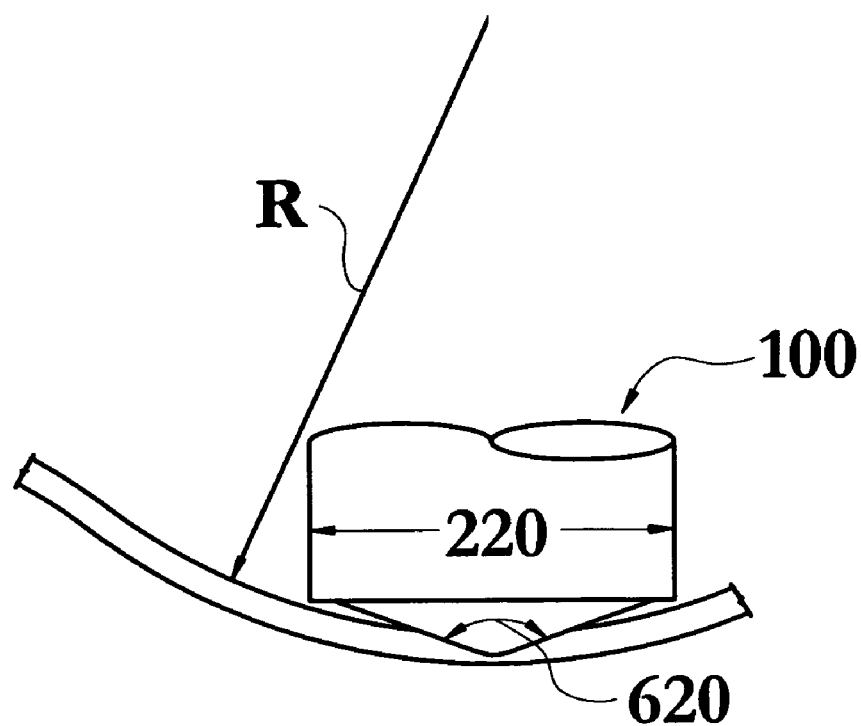
FIG. 23 shows a partial cross-section of one embodiment of the tool traversing an undulating joint, not to scale.
Figure 24:
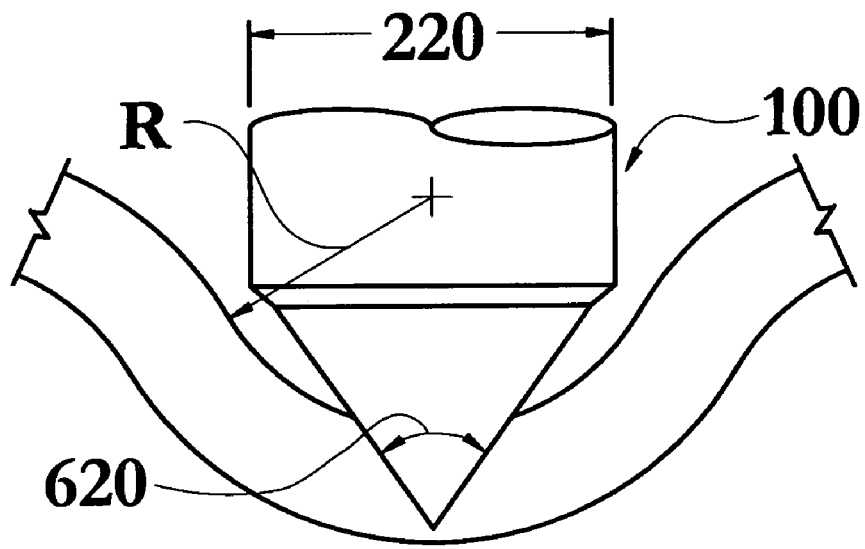
FIG. 24 shows a parial cross-section of one embodiment of the tool traversing an undulating joint, not to scale.

FIG. 19 illustrates how the present tool 100 eliminates such gouging and lift-off problems and permits the joining of workpieces 10, 20 having aggressive curvature. Selecting a tool 100 of the present design such that a portion of the head portion 400, and therefore a portion of the multi-section face 440, does not penetrate the joint 35 when joining a flat portion of the workpieces 10, 20 ensures that the body portion 200 to head portion 400 interface, or transition 300, does not gouge the joint 35, while the multi-section face 440 remains in contact with the joint at both the leading and trailing edges of the tool 100. In fact, it is often preferred to perform the welding operation with a portion of the first face section 441 within the joint, and thus the first and second workpieces 10, 20, and a portion of the first section 441 outside of the workpieces 10, 20. The curve of FIG. 19 is rather gradual, yet illustrates the point. The tool 100 of the present invention may be utilized in joining workpieces having complimentary curves that are much more severe. In fact, the present tool 100 may be used in configurations where the radius R of the at lease one cooperating curve is less than approximately two times the diameter 220 of the body portion 200 and greater than one-half the diameter 220 of the body portion 200. The present tool 100 is illustrated in FIG. 23, with a second face opening angle 620 of 140 degrees, traversing a curve with a radius R equal to twice the diameter 220 of the body portion 200. Similarly, a tool 100 with a second face opening angle 620 of 70 degrees is shown in FIG. 24 traversing a curve with a radius R equal to approximately seventy-five percent of the diameter 220 of the body portion 200.

Figure 20:
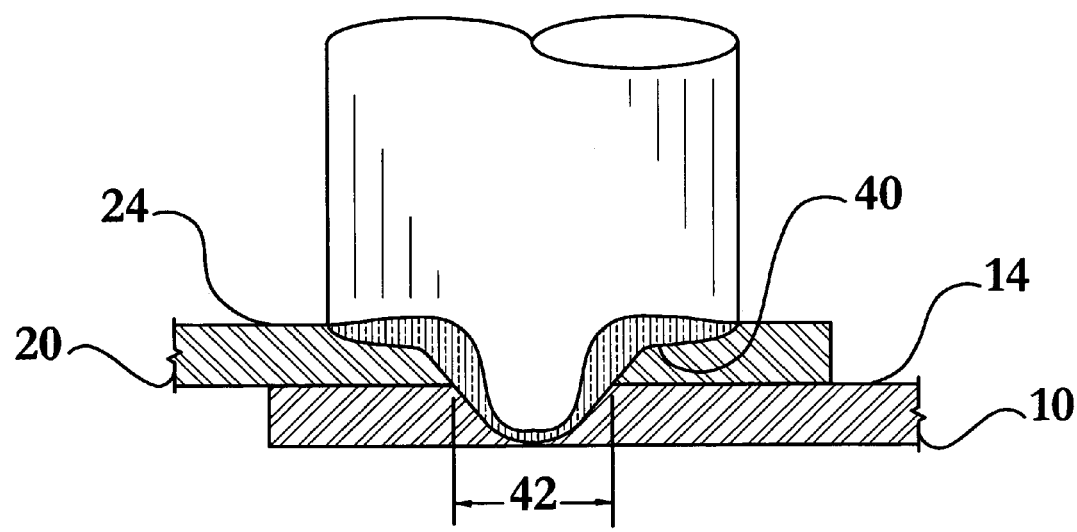
FIG. 20 shows a partial cross-section of a first and a second workpiece configured in a lap joint being welded by a typical conventional shouldered FSW, not to scale.
Figure 21:
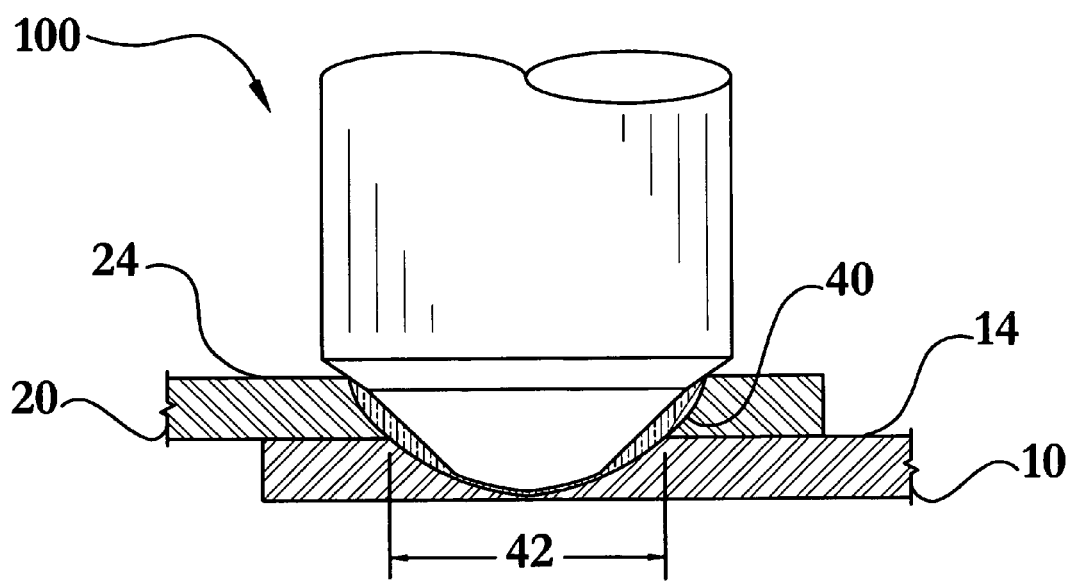
FIG. 21 shows a partial cross-section of a first and a second workpiece configured in a lap joint being welded by an embodiment of the present invention, not to scale.

Still further, another advantage of the present tool 100 is that it produces wider welds 40 than those produced by conventional shouldered friction stir welding tools 90, 95 of the same exterior diameter. FIGS. 20 and 21 illustrate that the lap joint weld width 42, being the width of the weld 40 at the interface between the first and second workpieces 10, 20, is much greater when using a tool 100 of the present invention, as seen in FIG. 21, than when using a conventional tool, as seen in FIG. 20. The improved weld width 42 is a result of the relatively flat head portion 400, when compared to prior art shouldered tools 90, 95, and results in more bonded area between the first and second workpieces 10, 20, and thus a higher load capacity.

The relatively flat head portion 400 is also beneficial when performing welds along tee joints, as seen in FIG. 22, and along corner joints. The large second face opening angle 620 of the tool 100 results in greater, and more complete, mixing of material between the first and second workpieces 10, 20. Additionally, the backing tool 700 may be selected to match the second face opening angle 620 of the tool 100 so that the face 400 may be parallel to an edge of the backing tool 700 and either touch the backing tool 700 or come into close proximity thereto, thereby minimizing or eliminating the potential for dead zones. Further, such a configuration has the additional benefit of aiding in the root side fillet/chamfer formation.

Figure 12:
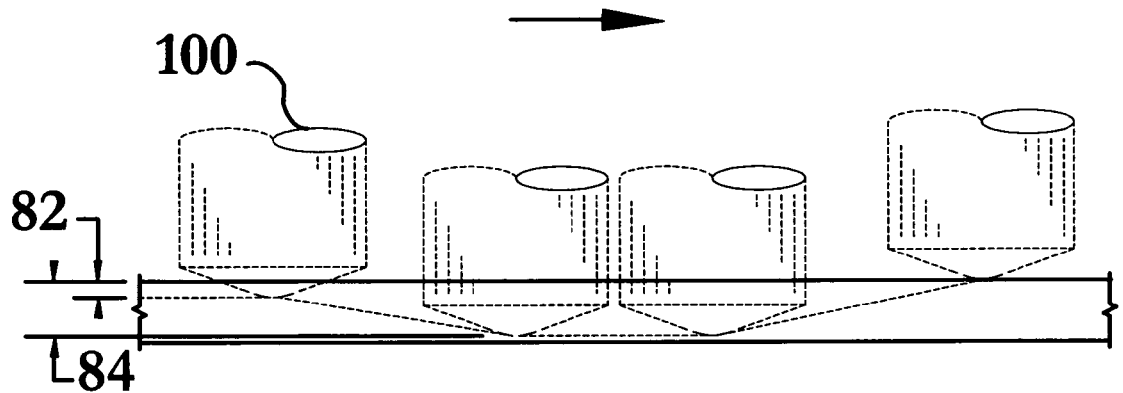
FIG. 12 shows a partial cross-section of an embodiment of the tool of the present invention as it traverses a joint from left to right while changing from a first penetration depth to a second penetration depth and then is retracted from the workpieces, not toe scale.

Further, the design of the present invention, namely the shoulderless transition 300 from the head portion 400 to the body portion 200, allows the weld penetration depth to change on the fly. For instance, the tool 100 may first be plunged into the workpiece(s) 10, 20 to a first penetration depth 82 and travel for a particular distance (left to right) before further extending, or retracting, into the workpiece(s) 10, 20 to a second penetration depth 84, as seen in FIG. 12. It is important to note that the present tool 100 is capable of entering the joint 35 as it is moving along the joint 35, and need not be first plunged to a particular depth and then traversed, as with prior tools. For instance, the far left tool 100 of FIG. 12 could have started its descent to the second position from the top surface rather than an initial depth. This can be particularly advantageous in welding lap joints, as seen in FIG. 9, and combination butt and lap joints, as seen in FIG. 10. It is significant to note that the tool 100 of the present invention is capable of plunging into the joint 35 as it is moving along the joint 35, it need not be first plunged into a joint 35 and then moved along the joint 35. Therefore, when joining the elements of FIG. 10 the tool 100 would first enter the joint 35 between the first and second workpieces 10, 20 to a first depth and then penetrate to a deeper depth in the vicinity of the third workpiece 30 so as to not only join the first workpiece 10 to the second workpiece 20 but to also join each of them to the third workpiece 30. Such adaptability is not found in the prior art tools.

Figure 25:
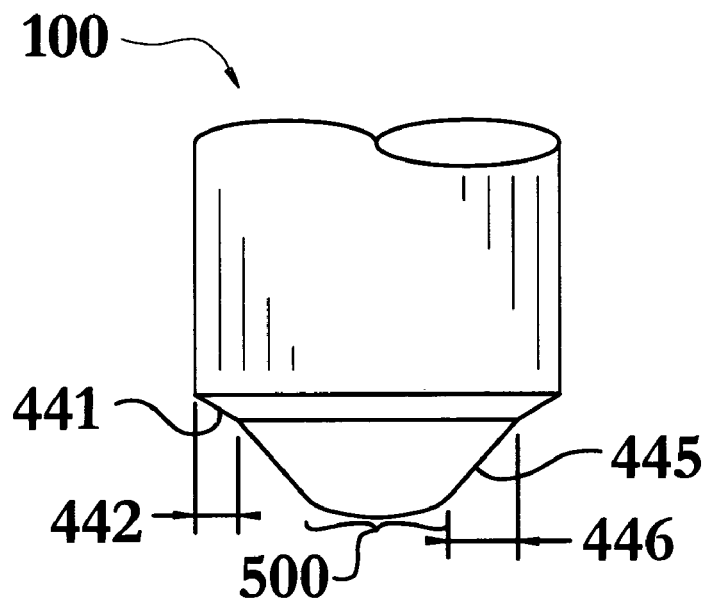
FIG. 25 shows a front elevation view of an embodiment of the tool of the present invention, not to scale.

As previously expressed, the head portion 400 includes a multi-section face 440 that converges to the tip section 500. This convergence may be in any manner and need not be uniform or continuous, as seen in FIG. 13. Each section of the multi-section face 440 has a horizontal projection component, namely a first section horizontal projection component 442 and a second section horizontal projection component 446, as seen in FIG. 25. The first section horizontal projection component 442 represents the magnitude of the portion of the first face section 441 that is orthogonal to the longitudinal axis 210. Similarly, the second section horizontal projection component 446 represents the magnitude of the portion of the second face section 446 that is orthogonal to the longitudinal axis 210. The magnitude of the first section horizontal projection component 442 is less than fifteen percent of the body portion diameter 220.

In one embodiment, the second face section 445 forms a substantially frustoconical shape with the second face section 445 converging to the tip section 500 at a second face opening angle 620, as seen in FIG. 25. The second face opening angle 620 may be virtually any angle but the range of between approximately 70 degrees and approximately 160 degrees, illustrated in FIG. 15, has been found to be effective, with the rang of approximately 100 degrees and 140 degrees even more preferred. A second face opening angle 620 of 90 degrees is illustrated in FIG. 14. The relatively flat head portion 400 and tip section 500 of the present invention also flies in the face of traditional FSW teachings.

In a further embodiment, the first face section 610 converges to the second face section 620, as seen in FIG. 25. The second face opening angle 620 may be virtually any angle but the range of between approximately 70 degrees and approximately 160 degrees, illustrated in FIG. 15, has been found to be effective, with the range of approximately 100 degrees and 140 degrees even more preferred. A second face opening angle 620 of 90 degrees is illustrated in FIG. 14. The relatively flat head portion 400 and tip section 500 of the present invention also flies in the face of traditional FSW teachings.

Figure 26:
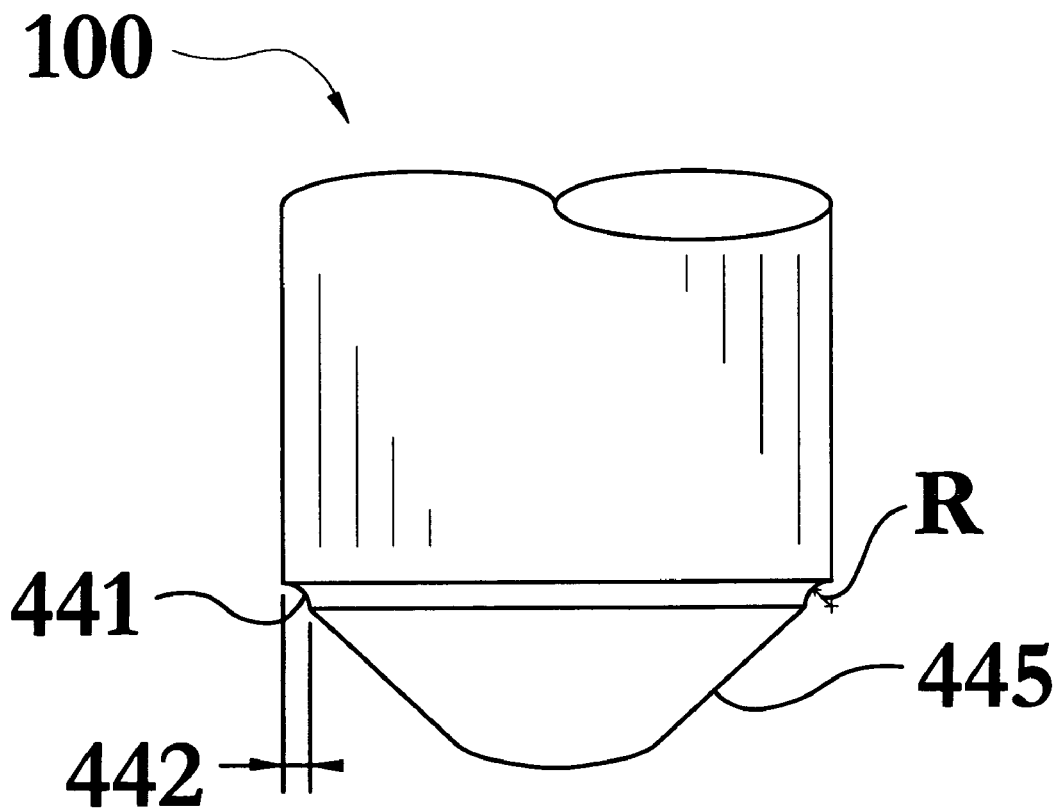
FIG. 26 shows a front elevation view of an embodiment of the tool of the present invention, not to scale.

In a further embodiment, the first face section 610 converges to the second face section 620 at a first face opening agle 610 to form a substantially frustoconical shape, as seen in FIG. 25. The first face opening angle 610 may be virtually any angle. For example, in one embodiment the first face opening angle is approximately 180 degrees, making the first face section 441 substantially orthogonal to the longitudinal axis 210, as seen in FIG. 15. In this embodiment the magnitude of the first section horizontal projection component 442 is less than approximately eight percent of the body portion diameter 220, and has worked effectively during experimentation at less than approximately five percent of the body portion diameter 220. In fact, a magnitude of the first section horizontal projection component 442 of between approximately two percent to approximately four percent of the body portion diameter 220 has been found to be particularly effective when joining titanium workpieces, while a magnitude of between approximately four percent to approximately eight percent of the body portion diameter 220 has been found to be particularly effective when joining steel workpieces. In an alternative embodiment the first face opening angle 610 is between approximately 40 degrees and 120 degrees. In further embodiments the first face section 441 is curved. One particular curved embodiment, shown in FIG. 26, has a radius of curvature R of less than fifteen percent of the body portion diameter 220. Regardless of the first face opening angle 610 or shape, the magnitude of the first section horizontal projection component 442 is less than fifteen percent of the body portion diameter 220, and is generally selected based upon the material of the workpieces.

Figure 27:
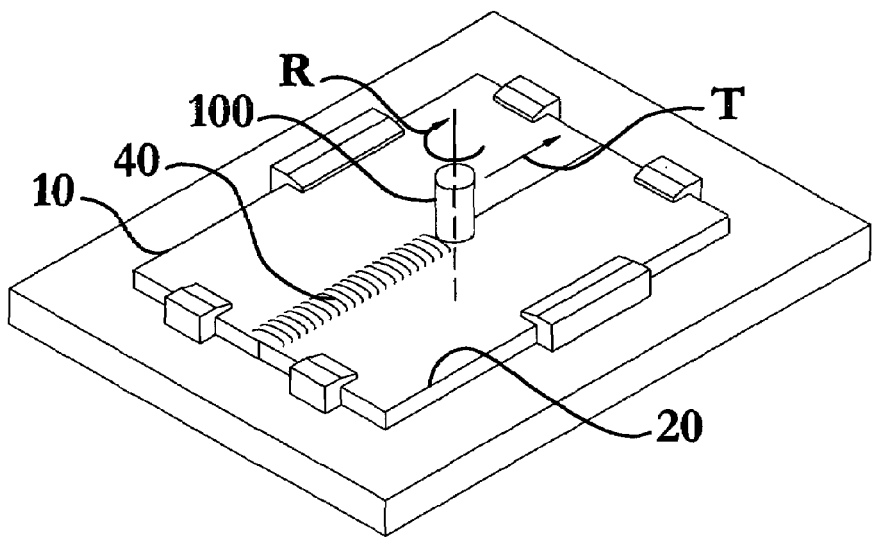
FIG. 27 shows an elevated perspective view of a first and second workpiece being joined by a tool of the present invention, not to scale.
Figure 28:
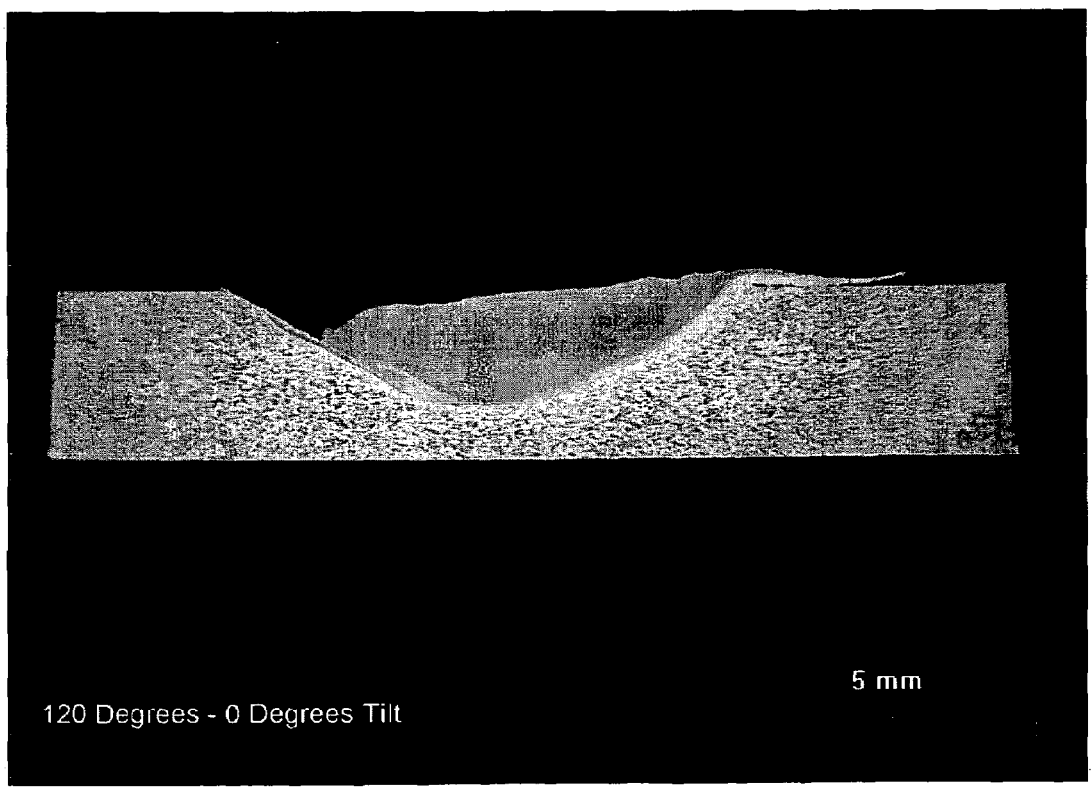
FIG. 28 is a photograph in transverse cross-sectional view, not to scale, of a weld having an excessive undercut on the advancing, or left side, and reinforcement and flash on the retreating side, or right side.
Figure 29:
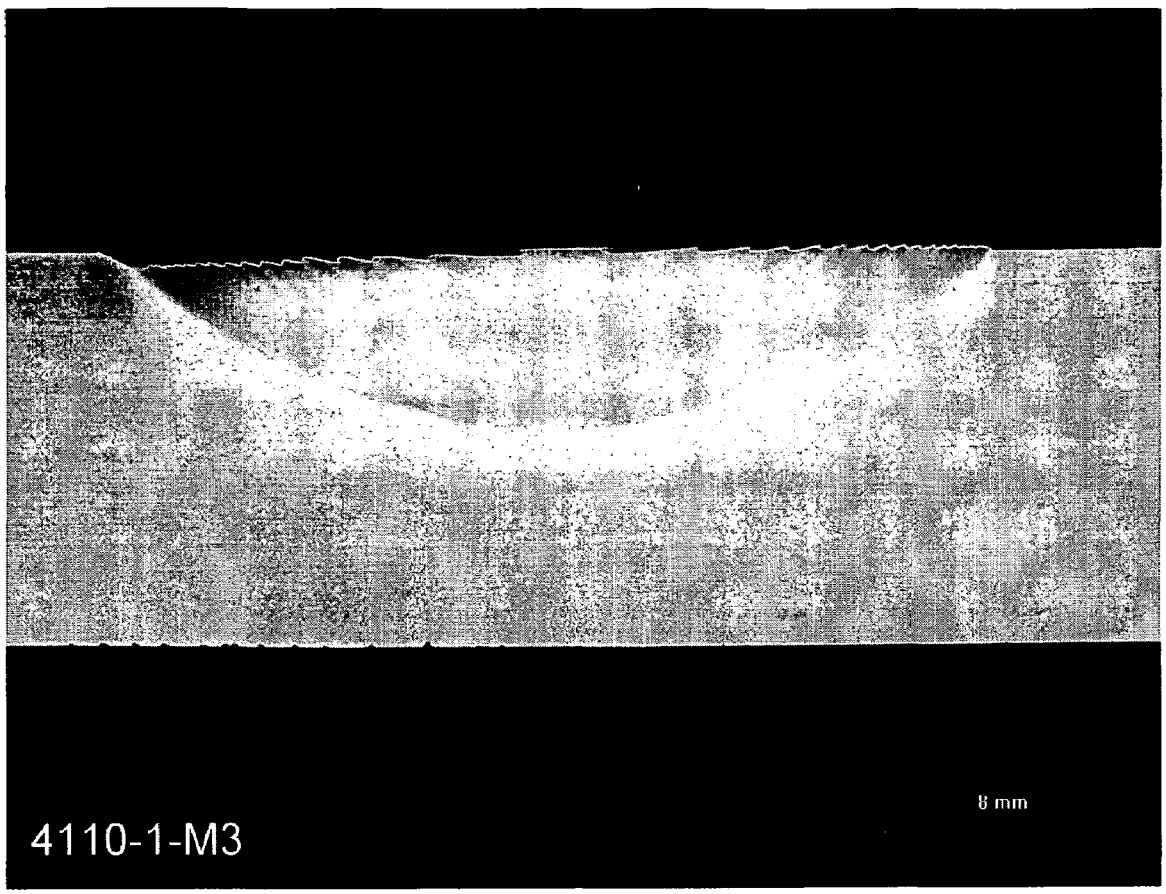
FIG. 29 is a photograph in transverse cross-sectional view, not to scale, of a weld produced with the tool of the present invention having a minimal undercut on the advancing, or left side.

The purpose of the first face 441 is to minimize the undercut, or under fill, on the advancing side of the tool 100. The advancing side of the tool 100 is the side of the tool 100 where the local direction of the multi-section face 440 due to tool rotation and the direction that the tool 100 is traversing T are in the same direction. Therefore, the advancing side of the tool 100 in FIG. 27 is the left side of the tool. Alternatively, the retreating side of the tool 100 is the side of the tool 100 where the local direction of the multi-section face 440 due to tool rotation and the direction the tool 100 is traversing T are in the opposite direction. Therefore, the retreating side of the tool 100 is FIG. 27 is the right side of the tool. Advancing side undercut, or under fill, is caused when plasticized weld material flows around the advancing side of the tool 100 and ends up on the retreating side of the weld in the form of increased local weld thickness, also referred to as positive reinforcement, or in the worst case loosely attached flash, thus leaving an area of reduced weld thickness, or undercut and under fill, on the advancing side of the weld, as seen in FIG. 28, a cross-sectional photo of a friction stir weld having undercut on the advancing side. Advancing side undercut conditions are particulary prevalent when the second face opening angle 620 is less than 140 degrees. A photograph in transverse cross-sectional view of a weld produced with the tool 100 of the present invention is shown in FIG. 29 having a minimal undercut on the advancing, or left side.

The first face 441 minimizes the undercut by increasing the amount of plasticized weld material that is dragged around the tool 100 from the retreating side to the advancing side, thereby infilling the undercut area. The size and configuration of the first face section 441 play a direct role in reducing the undercut and on tool 100 performance. The larger the first face section 441 the more plasticized weld material is transferred to the advancing side, yet a large first face section 441 reduces the robustness of the tool 100. Therefore, referring again to FIG. 25, the present invention recognized this balancing act and has related it to the first section horizontal projection component 442. It is preferential to have the magnitude of the first section horizontal projection component 442 less than fifteen percent of the body portion diameter 220. Further, the magnitude of the first section horizontal projection component 442 preferably selected depending on the material of the workpieces. For example, when joining titanium workpieces, which do not transfer the heat created during FSW particularly well, the magnitude of the first section horizontal projection component 442 may be relatively small because the plasticized titanium adheres well to the first face section 441. Conversely, when joining steel workpieces, which transfer the heat created during FSW particularly well, the magnitude of the first section horizontal projection component 442 must be larger because the plasticized steel does not adhere well to the first face section 441. Therefore, the magnitude of first section horizontal projection component 442 necessary when joining titanium is roughly fifty percent of the magnitude necessary when joining steel. For example, a first section horizontal projection component 442 having a magnitude of eight percent, or less, of the body portion diameter 220 has been found to work particularly well when joining titanium workpieces, whereas a first section horizontal projection component 442 having a magnitude of twelve percent, or less, of the body portion diameter 220 has been found to work particularly well when joining steel workpieces. In particular, in the embodiments wherein the first face opening angle 610 is between approximately 40 degrees and approximately 120 degrees a magnitude of the first section horizontal projection component 442 of between approximately two percent to approximately four percent of the body portion diameter 220 has been found to be particularly effective when joining titanium workpieces, while a magnitude of between approximately four percent to approximately eight percent of the body portion diameter 220 has been found to be particularly effective when joining steel workpieces. Further, in the embodiments wherein the first face section 600 is curved experimentation has shown that a magnitude of the first section horizontal projection component 442 of between approximately three percent to approximately six percent of the body portion diameter 220 has been found to be particularly effective when joining titanium workpieces, while a magnitude of between approximately six percent to approximately twelve percent of the body portion diameter 220 has been found to be particularly effective when joining steel workpieces.

In one embodiment the tip section 500 is a flat shape 540, as seen in FIGS. 7 and 15. Alternatively the tip section 500 may be a curved shape 530, as seen in FIGS. 14 and 11. Still further, the tip section 500 may by pyramidal in shape, or virtually any other shape imaginable. Since the head portion 400 converges to the tip section 500 there will always be tip section diameter 510 at the interface between the tip section 500 and head portion 400, as seen in FIGS. 14 and 15. It is at the tip section diameter 510 that the tip section 500 transitions to the head portion 400. In one embodiment the tip diameter 510 is less than approximately forty percent of the body portion diameter 220 or the head portion diameter 420. Such an aggressive convergence is unlike prior FSW tools. In some embodiments the tip section 500 continues to converge at the same angle as the head portion 400 and is therefore indistinguishable from the head portion 400, as in the case of a simple cone seen in FIG. 24.

Figure 16:
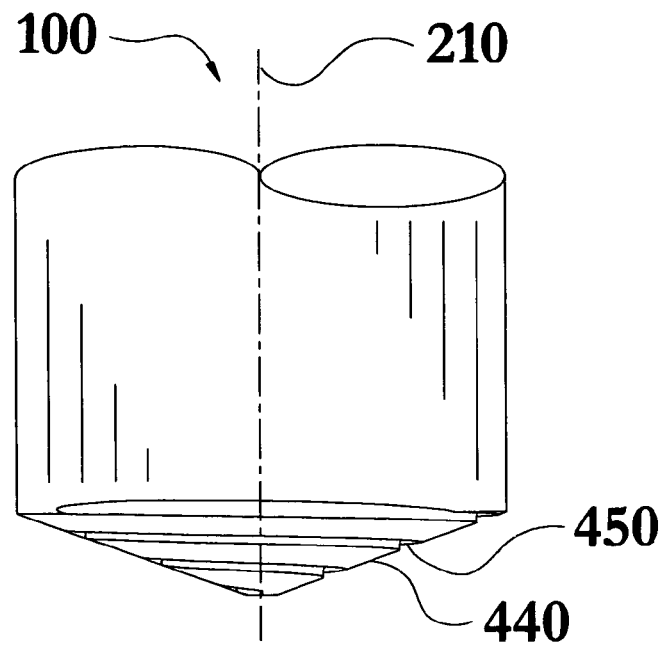
FIG. 16 shows a front elevation view of an embodiment of the tool of FIG. 7, not to scale.

The multi-section face 440 of the head portion 400 and the sidewall 230 of the body portion 230 may be substantially smooth or contain friction and/or plunge control features. For instance, in one embodiment the multi-section face 440 of the head portion 400 is formed with at least one recess 450, as seen in FIG. 16, to aid in heat generation; stirring of the weld 40; reduction of surface flash formation; and improved stability of the tool 100 during the plunge. Alternatively, the multi-section face 440 may include projections extending from the multi-section face 440 such as threads or stipples, as disclosed in the prior art.

The present tool 100 also eliminates the points of high stress concentration present in conventional prior art shouldered tools 90, 95. Typically the pin 92, 97 of conventional prior art shouldered tools 90, 95 is approximately one-third the diameter of the overall tool diameter, as seen in FIGS. 1 and 2. This change in diameter occurs at the shoulder 91, 96 and is a point of particularly high stress in the pin 92, 97. Obviously, the present design seen in FIG. 11 does not contain such points of high stress concentration. Further, the useful life of a tool 100 of the present design is significantly greater than that of conventional prior art shouldered tools 90, 95.

While the disclosure herein refers generally to a first workpiece 10 and a second workpiece 20, the present invention may be used in joining more than just two workpieces or in the repair of a single workpiece. For example, the tool and methods of the present invention may be used in friction stir processing of a single workpiece to improve its properties. Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims. The corresponding structures, materials, acts, and equivalents of all means or step plus function elements in the claims below are intended to include any structure, material, or acts for performing the fnctions in combination with other claimed elements as specifically claimed.

We claim:

1. A method for joining curved workpieces by friction stir welding, comprising the steps of:

placing a first workpiece having a first thickness in close proximity to a second workpiece having a second thickness thereby creating a joint, wherein the first workpiece and second workpiece each have at least one cooperating curve;

plunging a portion of a rotating non-consumable multi-section faced shoulderless variable penetration friction stir welding tool into the joint to be welded to a first penetration depth wherein the tool comprises a cylindrical body portion, a head portion, and a tip section, each integral to the tool, the body portion having a longitudinal axis about which it is rotable, a diameter, a sidewall parallel to the longitudinal axis, a proximal end, and a distal end, the head portion located at the distal end of the body portion having a base with a diameter equal to the diameter of the body portion forming a smooth transition between the body portion and the head portion, and the head portion having a multi-section face with a first face section nearest the body portion and a second face section nearest the tip section wherein the multi-section face converges to the tip section having a diameter and a center wherein the center is located on the longitudinal axis, a height from the distal-most portion of the tip section to the base along the longitudinal axis and the first face section having a first section horizontal projection component with a magnitude of less than fifteen percent of the body portion diameter;

traversing the joint and the at least one cooperating curve with the rotating tool ensuring that a portion of the first face section is in contact with the first workpiece and the second workpiece, and no part of the body portion extends into the first workpiece or the second workpiece such that no gouging occurs; and gradually retracting the portion of the rotating tool from the workpieces while traversing the joint so that the tool exits the workpieces at a predetermined exit point leaving a friction stir weld free of an exit hole.

2. The method of claim 1, wherein the radius of the at least one cooperating curve is less than two times the diameter of the body portion and greater than one-half the diameter of the body portion.

3. The method of claim 1, wherein the portion of the rotating non-consumable multi-faced shoulderless variable penetration friction stir welding tool that is plunged into the joint is a portion of the head portion such that a portion of the first face section is within the first and second workpieces and a portion of the first face section is outside the first and second workpieces.

4. The method of claim 1, wherein the second face section forms a frustoconical shape with the second face section converging to the tip section at a second face opening angle between 70 degrees and 160 degrees.

5. The method of claim 1, wherein the first face section forms a frustoconical shape with the first face section converging to the second face section at a first face opening angle.

6. The method of claim 5, wherein the first face opening angle is between 40 degrees and 120 degrees.

7. The method of claim 1, wherein the first face section is orthogonal to the longitudinal axis.

8. The method of claim 1, wherein the first section horizontal projection component has a magnitude of less than eight percent of the body portion diameter.

9. The method of claim 1, wherein the first face section is curved having a radius of curvature of less than fifteen percent of the body portion diameter.

* * * * *